Dec. 14, 1965　　　　T. W. MOORE　　　　3,223,894
BATTERY CHARGING APPARATUS
Filed Aug. 13, 1959　　　　　　　　　　4 Sheets-Sheet 1

INVENTOR:
THOMAS W. MOORE
BY
ATTORNEY

Dec. 14, 1965     T. W. MOORE     3,223,894
BATTERY CHARGING APPARATUS
Filed Aug. 13, 1959     4 Sheets-Sheet 2
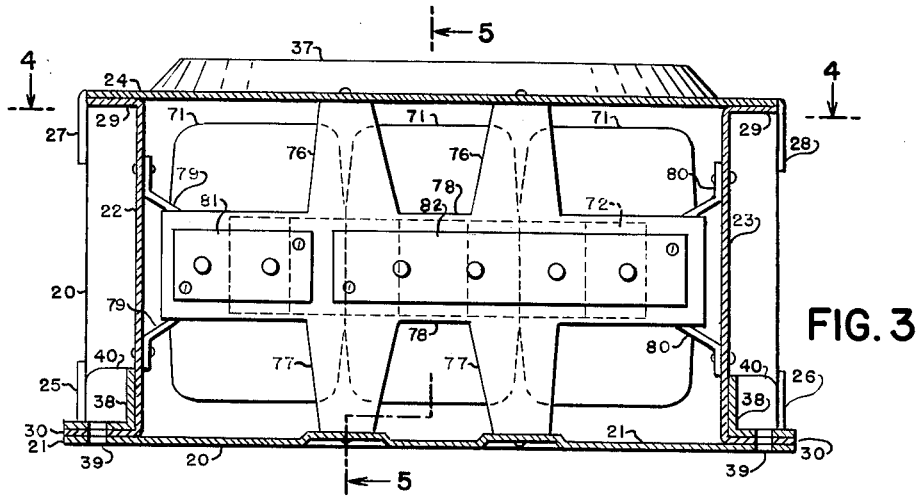
FIG. 3
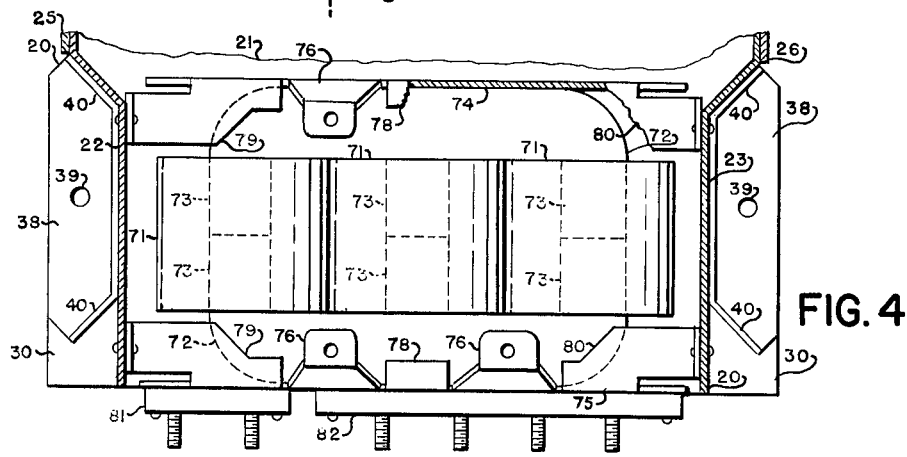
FIG. 4
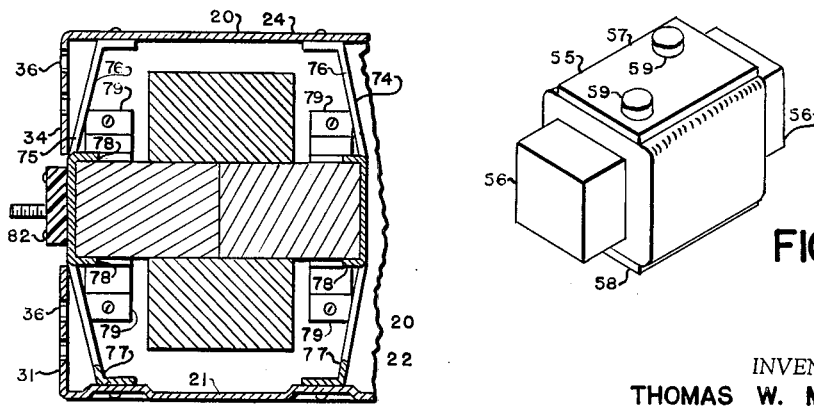
FIG. 5
FIG. 6
INVENTOR:
THOMAS W. MOORE
BY
ATTORNEY Dec. 14, 1965    T. W. MOORE    3,223,894
BATTERY CHARGING APPARATUS
Filed Aug. 13, 1959    4 Sheets-Sheet 3

INVENTOR:
THOMAS W. MOORE
BY
ATTORNEY

# United States Patent Office 3,223,894
Patented Dec. 14, 1965

3,223,894
BATTERY CHARGING APPARATUS
Thomas W. Moore, Dayton, Ohio, assignor to American Machine & Foundry Company, a corporation of New Jersey
Filed Aug. 13, 1959, Ser. No. 833,479
3 Claims. (Cl. 317—100)

This invention relates in general to battery charges and, more particularly, to those battery chargers which are used in aircraft or the like where weight, size, and resistance to extreme environmental conditions are important. The novel circuitry and the electrical features involved in this invention are described in my Patent No. 3,054,041, issued September 11, 1962, and entitled, Charging System for Silver-Zinc Batteries.

An object of this invention is to provide a more rugged, compact and light battery charger.

Another object of this invention is to provide an air-cooled battery charger which makes more efficient use of blowers, obviates the necessity of using any weighty heat exchangers, and allows the use of dual blowers, each of which will cool all the elements of the battery charger sufficiently to allow it to continue functioning after the failure of one blower.

A further object of this invention is to provide a battery charger in which the electrical components are arranged to be more efficiently cooled by one or more blowers.

Still another object of this invention is to provide a more rigid shock and vibration resistant battery charger which has its heavier electrical components secured by mountings which span the casing of the battery charger to be fixed to its base, sides and cover. This results in a more secure mounting of the electrical components while allowing them to serve as structural members to strengthen the entire unit.

Yet another object of this invention is to provide, for transformers and the like, a self-supporting coil structure containing cooling ducts.

A still further object of this invention is to provide a blower-cooled battery charger having its electrical components arranged to be consecutively cooled by a flow of air from one end of the battery charger to the other. The electrical components are placed in a particular order according to their temperature sensitivity so that the air blows progressively from the most temperature dependent elements to the least heat sensitive elements.

A feature of this invention is the provision of a high speed fan within a cylindrical shroud mounted between and in intimate contact with more massive heat-conducting saddle elements. The relatively high tip velocity of the fan blades removes heat from the shroud at a high enough rate to do away with the necessity of having any separate heat exchangers while the saddles are cooled by their intimate contact with the shrouds and conduct heat from electrical components mounted on the saddles.

Another feature of this invention is to provide transformer windings extending on at least one side in alternate layers of windings of triangular and rectangular configuration so as to be self-supporting and provide cooling ducts between the alternate layers of windings.

Still another feature of this invention provides for the easier handling of the heavy leads from the transformers to the terminal blocks in that the terminal blocks are mounted on the transformer assembly and are connected to the appropriate leads from the transformers before the transformer assembly itself is secured within the casing of the battery charger.

Additional objects, advantages, and features of invention reside in the construction, arrangement, and combination of parts involved in the embodiment of the invention and its practice otherwise as will be understood from the following description and accompanying drawings wherein:

FIG. 3 is a vertical section through the casing of the battery charger showing the transformer assembly secured within the casing;

FIG. 4 is a section taken on line 4—4 of FIG. 3 showing the transformer assembly secured within the casing and with a portion of a mounting bracket broken away to show the transformer core;

FIG. 5 is a section taken on line 5—5 of FIG. 3;

FIG. 6 is a perspective view of a magnetic amplifier;

Figure 1:
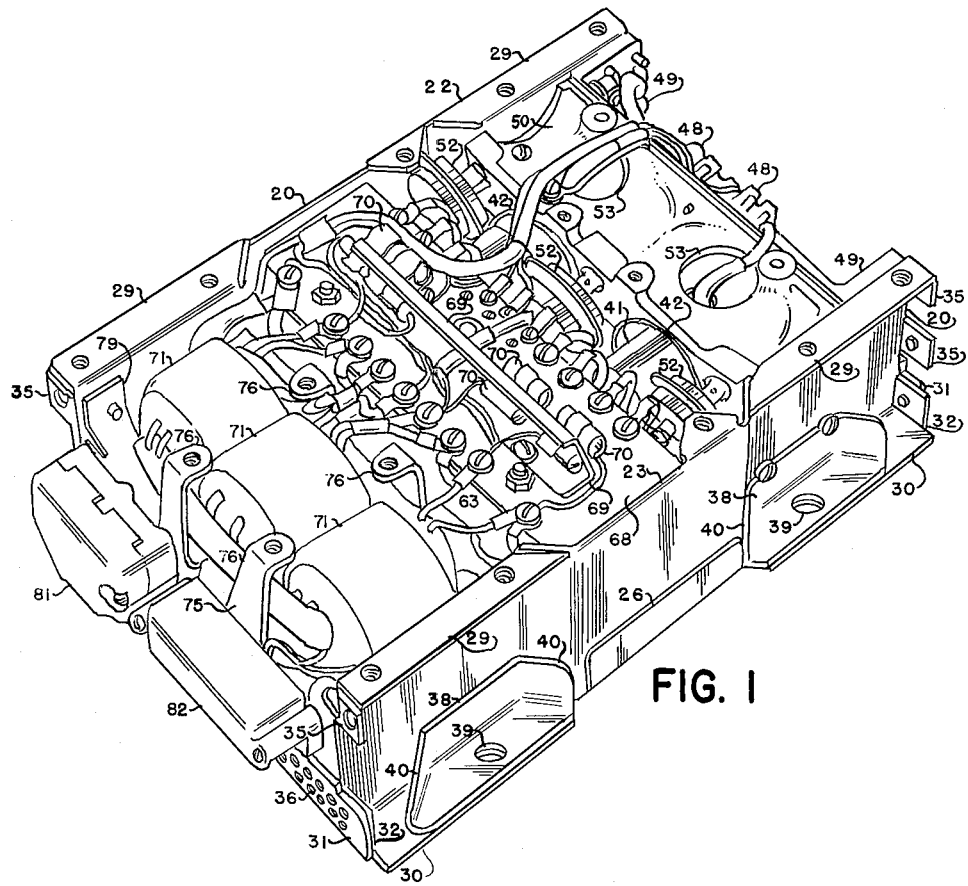
FIG. 1 is a perspective view of the battery charger with the cover removed.
Figure 2:
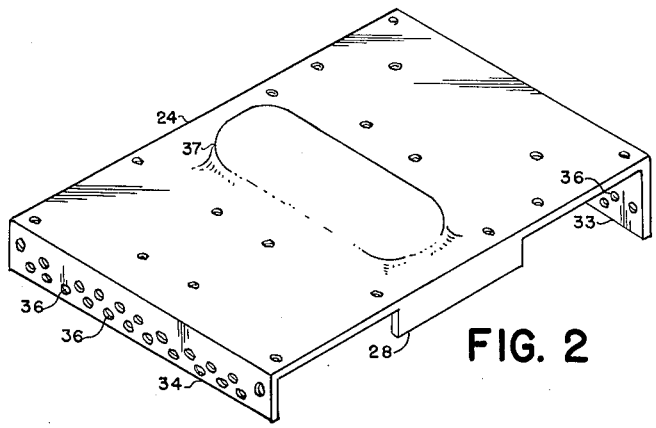
FIG. 2 is a perspective view of the cover.

With the exception of FIG. 1, the wiring and substantially all of the smaller electrical elements are not shown in the drawings so that the mechanical and structural features of the invention may be more clearly indicated. Referring to the drawings in detail, FIG. 1 and FIG. 3 show that the container 20 of the battery charger comprises a base plate 21, the side plates 22 and 23, and the cover 24. The central portions of the sides of the base plate 21 are extended and bent upwards to form the flanges 25 and 26 which are fixed to the side plates 22 and 23 with screws or any other suitable fastening means. The cover 24 has two similar downward projecting flanges 27 and 28 which are also fastened to the side plates 22 and 23. These side plates are constricted at both ends of the battery charger and have their upper and lower end portions bent outwards to form the upper mounting flanges 29 and the lower mounting flanges 30 to which the cover 24 and the base 21 are fixed respectively. The ends 31 of the base plate are bent upwards and secured to the outwardly bent end flanges 32 while the front end 33 and the rear end 34 of the cover plate 24 are bent downwards and secured to the end flanges 35 in a like manner. These ends 31, 33 and 34 have a series of ventilating apertures 36 formed in them to allow for the intake of cooling air into the front of the unit and its exhaust from the rear of the unit.

As may be seen in FIG. 1, FIG. 3, and FIG. 4, the reinforcing brackets 38 are welded to the sides 22 and 23. The entire battery charger is held in place by means of tie down bolts which pass through the mounting apertures 39. The heads of these tie down bolts, or nuts that are turned down over them, do not extend beyond the outer edge of the base plate 21, the lower mounting flanges 30, or the reinforcing brackets 38. However, the gussets 40 of the reinforcing brackets 38, as shown in FIG. 1, are spaced far enough away from the apertures 39 to allow an open end wrench to be placed over the tie down bolts and moved through the proper angle to tighten them and secure the entire unit. These reinforcing brackets transfer stresses from the bolts to the side plates 22 and 23 to which they are welded and to the base by compression. Thus, the stresses are transferred to the whole container 20. This is a necessary consideration where a unit may be subjected to intense shock and vibration and yet must have a large factor of safety. Despite the fact that the container 20 is a particularly strong, rigid structure, the elements that it contains are additionally mounted so as to be cantilevered across it and actually further strengthen the whole unit.

Figure 11:
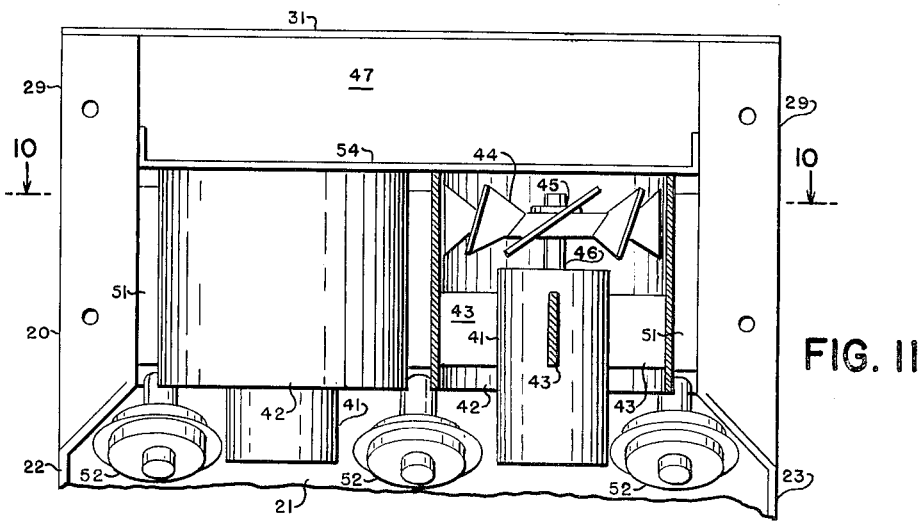
FIG. 11 is a top view of the broken away blower end of the battery charger with the top cover and one saddle removed and with one fan shroud shown in section.

As may be seen in FIGS. 1, 10, 11 and 12, two motors 41 are mounted within the cylindrical shrouds 42 by means of the four radial supports 43. The fans 44 are mounted by means of their hubs 45 on the motor shafts 46. Although the blades of the fan 44 in FIG. 11 are shown as being perfectly flat, in actual practice they may be standard axial flow fans with curvilinear blade configuration. Experience has demonstrated that the cooling fan motors of a unit such as this are the least reliable piece of equipment and the most prone to failure. For this reason, two blowers are used, so that, if one fails, the other can take care of the cooling requirements. A special arrangement, construction, and configuration of the parts of the battery charger, which will be described hereafter, make this possible. One manner in which the likelihood of blower failure can be minimized in this application is by having the blower motors 41 operate from a lower voltage secondary of the power transformers. This allows the resulting fewer turns of heavier wire inside the motors to carry lower voltages which are not so likely to break through the insulation of the motor windings.

Figure 12:
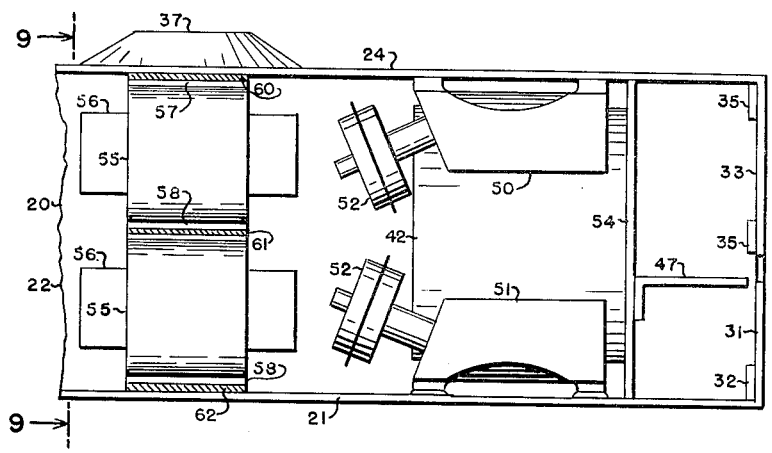
FIG. 12 is a side view of the broken away blower end of the battery charger with one side removed and with the transverse mounting brackets shown in section.

As shown in FIG. 1 and FIG. 12, the logic circuit components 48 of the charging system are mounted on a shelf 47 which is directly in the path of the air intake before any heat has been added to the air. Additional elements 49 of the electrical circuitry of the charging system which are fully described in my aforementioned copending patent application, may be mounted on plates secured to the sides 22 and 23. Then any heat produced by resistors or other elements forming a part of this circuitry may also be conducted away by the sides 22 and 23 which are in intimate contact with the saddles 50 and 51. In this manner, these most temperature sensitive elements, which do not, in themselves produce any significant quantities of heat, are placed in posiitons by the air intake to get preferential cooling where there will be the least rise in temperature to affect their performance.

As the fans 44 are turned within the shrouds 42, they rotate at comparatively high speeds and the tip velocity of each fan blade is several times the axial velocity of the air passing through the blower. Thus a particle of air passing through a blower near the cylindrical inner surface of a shroud 42 describes a high velocity spiral path and may pass over a given side of the shroud many times in the course of passing through the blower. Since the coolinng effect of the air depends on the mass of cool air passing a given point in a given time, the high speed of the air describing this spiral path allows a given mass of air to pass a side of a shroud several times while passing through it. This increases the cooling effect of the air passing through the shroud to the extent that a bulky, weighty conventional heat exchanger with a large surface area need not be used. In addition, since the aerodynamic back pressure usually developed across a heat exchanger surface is greatly reduced using these shrouded, high speed fans; smaller, lower powered, lighter fan motors may be used.

The power rectifiers 52 are relatively heat sensitive elements which also produce a considerable quantity of heat which must be carried off. These power rectifiers are mounted directly in the massive saddles 50 and 51 which are of a highly conductive aluminum alloy and are in intimate contact with the shrouds 42. Bolts, which are not shown, may pass from the upper saddle 50 to the lower saddle 51, drawing the saddles together and clamping the blowers between them. These saddles are each fixed to the side walls 22 and 23 with a fairly large area of contact and they are also secured to the base 21 and the cover 24. Thus the heat produced by the power rectifiers 52 is conducted to the efficiently air cooled shrouds 42 by the saddles 50 and 51. Even if one blower should fail, the saddles will still conduct heat to the functioning blower's shroud to keep the temperature of all the power rectifiers down and permit the continued functioning of the battery charger. As further shown in FIG. 1, these saddles may have apertures 53 formed in them to reduce their weight without materially affecting their heat conductivity. These saddles serve four simultaneous purposes which result in a great saving of weight, size, and expense. They serve as a mounting for the power rectifiers 52, as a mounting for the blowers, as a cooling means for the power rectifiers 52, and as a structural element of the container 20. A baffle plate 54, as shown in FIGS. 11 and 12, contacts the cover, the base, and the sides and fits over the front ends of the shrouds 42 to prevent any forward recirculation of air outside the shrouds 42.

Figure 9:
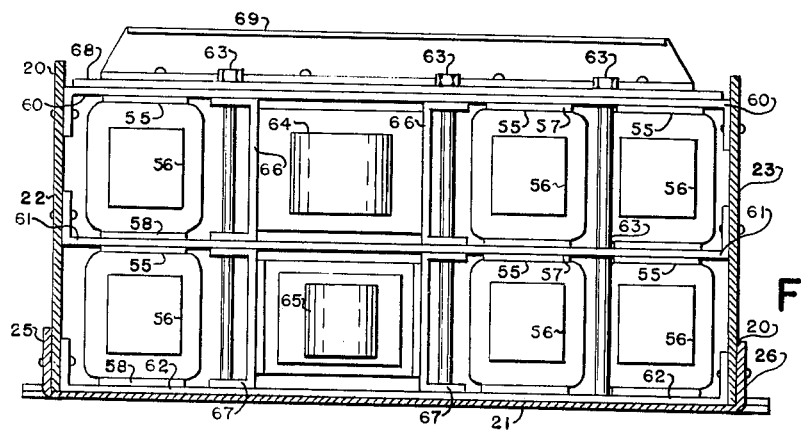
FIG. 9 is a section taken on line 9—9 of FIG. 12.
Figure 10:
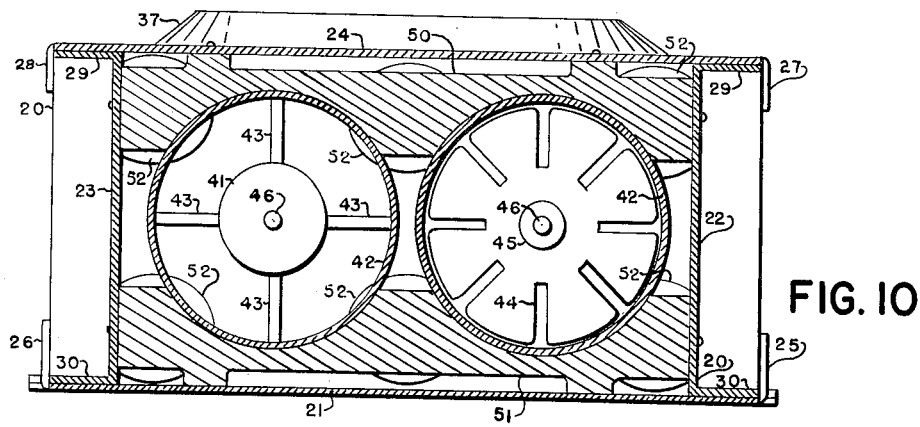
FIG. 10 is a section taken on line 10—10 of FIG. 11 with one fan removed to show the mounting of the fan motor within the shroud.

After the air passes through the shrouds 42 cooling the fan motors 41, it passes through the center section of the unit as shown in FIG. 1, FIG. 9, and FIG. 12. This center section contains six of the magnetic amplifiers 55 as shown in FIG. 6. These magnetic amplifiers 55 are fabricated using the type DU laminations to form the cores 56. This permits the precision winding of their coils of a heavy square or rectangular wire on special bobbins. The resulting coils, which are form-cured with a polyester thermosetting resin, are so extremely rigid that they can be used as a mounting medium because the rigid, outer coils of square wire keep pressure from the strain-sensitive laminations. Flat upper and lower portions 57 and 58 have projecting from them the mounting lugs 59. These flat portions and the lugs may be formed during the form-curing of the coils. Three transverse support members 60, 61, and 62 are bolted across this center section to the side walls 22 and 23. The mounting lugs 59 of the six magnetic amplifiers 55 extend into corresponding apertures in the transverse support members and, as shown in FIG. 9, bolts 63 may pass through the transverse support members 60, 61, and 62 to hold the whole center section assembly together in compression. An interphase transformer 64 and an inductor 65 are mounted one above the other between suitable mounting brackets 66 and 67. Since the interphase transformer 64 is a relatively small unit, a transductor, which is not shown, may be mounted behind it. When the bolts 63 are tightened, the entire center section assembly becomes a rigid, self-supporting unit which serves to strengthen the container 20 where it is disposed across it. FIG. 1 and FIG. 9 show the terminal block 68 which is secured across the transverse support member 60. A channel 69 is fixed over the terminal block 68 and serves to stiffen the center section assembly and also to provide a place of attachment for the elements 70 of the radio noise filter section. The cover 24 has a central raised portion 37 to fit over the channel 69.

After the cooling air passes and cools these elements comprising the center section assembly, it reaches the power transformers 71 shown in FIGS. 1, 3, 4 and 5. Two large E cores 72 have a leg 73 extending one-half the way through each transformer 71 and they are secured in place in any conventional manner to make the three phase power transformer a single, rigid unit. The transformers 71 are supported by their cores 72 by the two identical front and rear mounting brackets 74 and 75. Each has two central upper and lower legs 76 and 77 which may be fixed to the cover 24 and the base 21 respectively and still allow air to flow to each of the transformers 71. Central tabs 78 are folded to extend above and below the cores 72 to hold them as do the larger side tabs 79 and 80. The ends of these side tabs are splayed upwards and downwards to be fixed to the side walls 22 and 23. The input and output terminal blocks 81 and 82 are fixed directly to the rear mounting bracket 75. Since connections must be made from the terminals to the transformers 71 with fairly heavy wire, excessive space would be necessary in order to connect a terminal block to a transformer, if the two elements were first secured in position in the battery charger. The space which would be needed to make these connections is saved by mounting the terminal blocks on the power transformer assembly rear mounting bracket 75 and making the difficult connections before the transformer assembly is put in place. When they are installed, the terminal blocks project beyond the container 20 between end flange 31 of the base 21 and the end flange 34 of the cover 24. Merely mounting a heavy transformer assembly in the bottom of a relatively light container would result in a major problem with respect to vibration; however, this mounting of the rigid transformer assembly across the unit allows it also to serve as a structural reinforcement for the casing 20.

Figure 7:
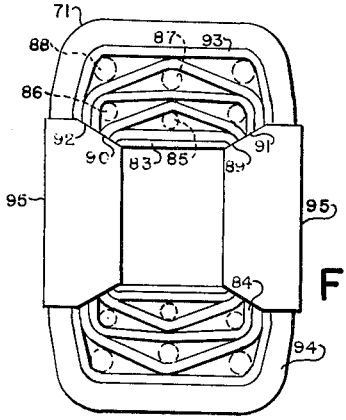
FIG. 7 is a front view of a transformer with its core removed as used in this invention.
Figure 8:
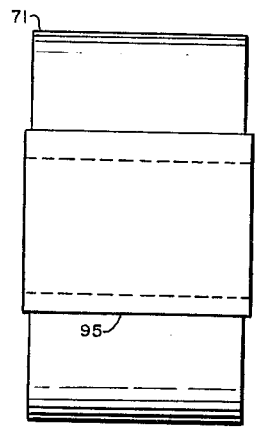
FIG. 8 is a side view of a transformer with its core removed as used in this invention.

As shown in FIGS. 7 and 8, each transformer 71 is wound on a bobbin 83. The inner secondary coil 84 is wound of heavy square or rectangular wire. The first layer 89 is wound in a conventional manner, the second layer 90, at each end of the coil 84, passes over a centrally located pin 85, the third layer 91 passes over two outwardly disposed pins 86, the fourth layer 92 passes over another centrally located pin 87, and the fifth layer 93 passes over two more outwardly disposed pins 88. The primary coil 94 is wound over the secondary 84 and the pins 85, 86, 87, and 88 are removed. These alternate layers of windings of triangular and rectangular form are mutually self-supporting and result in a very strong coil containing cooling ducts. The strength of this coil structure results, as the apex of the triangle formed by each layer wound on a centrally located pin supports the center of the rectangular layer above it. This results in the maximum unsupported span of the windings being but one-half the width of the coil. This method of constructing a self-supporting coil structure is simple and inexpensive as standard drill rod pins can be used to make the coil winding fixtures. Conventional clamping members 95 are shown securing the completed transformer windings 71.

The physical layout of the whole battery charger structure results in a particularly compact, yet efficient design. The elements are cooled in the order of their heat sensitivity with the least heat sensitive elements, the power transformers, cooled last. This is also desirable as the power transformers are a major heat producing element of the battery charger. In addition, the entire unit is particularly vibration and shock resistant, as the heavier elements, the blowers, the magnetic amplifiers with the other elements associated in the center section assembly, and the power transformers, are formed into self-supporting structural units cantilevered across the entire container and fixed to its walls and base. Therefore, the container 20 is as much a wrap-around cover as it is a structural support for these heavy elements. Furthermore, the rectangular configuration of the container provides for an essentially constant, net internal cross-section for air flow, thereby reducing back pressure to a minimum.

While I have disclosed my invention with particularity in the best form know to me, it will nevertheless be understood that this is purely exemplary and that modifications in the construction, arrangement and combination of parts, substitution of materials, and substitution of equivalents mechanically, electrically, and otherwise, may be made without departing from the spirit of the invention except as it may be more particularly limited in the appended claims wherein I claim:

1. An air cooled battery charger comprising in combination, a container having base, side and top walls and having front and back openings at each end, at least one heat conducting member transversely disposed between selected opposite walls of said container and proximate one end thereof, at least one shroud mounted in intimate heat conducting contact with said heat conducting member, fan means having blades mounted within said shroud to direct a current of air therethrough and through said container from said front to back openings, electrical components progressively arranged within said container in accordance with the heat sensitivity thereof, the components of greatest heat sensitivity being disposed in the intake air stream of said fan and in advance of the intake thereof, and heat producing, rectifying circuit elements mounted on said transverse heat conducting member in heat exchanging relationship therewith, said fan being operative to provide cooling air for conducting heat produced by said rectifiers away from said shroud and cool said progressively arranged electrical components.

2. The invention defined in claim 1 wherein said fan blades have tips positioned closely adjacent the inner wall of said shroud, and wherein the tip velocity of said fan blades while being rotated by said motor is substantially in excess of the axial velocity of air being forced through said shroud.

3. An air cooled battery charger comprising in combination a container having base, side and top walls and having a front and back opening at each end, upper and lower heat conducting saddles spanning said container proximate one end thereof and fixed in supporting relationship to a selected pair of walls of said container, at least one shroud clamped in intimate heat conducting contact between said saddles, fan means having blades mounted within said shroud to direct a current of air therethrough, temperature sensitive, low heat producing circuit elements of said battery charger mounted within said container forwardly of said shroud, transverse mounting brackets, less temperature sensitive circuit elements positioned between said transverse mounting brackets to form a rigid structure fixed to selected walls of said container and heat producing rectifying circuit elements mounted on said saddles in heat exchanging relationship therewith, the tip velocity of said fan blades being substantially greater than the axial velocity of the air being directed through said shroud in order to increase the conduction of heat supplied by said rectifying circuit elements away from the wall of said shroud.

References Cited by the Examiner

UNITED STATES PATENTS

| 829,780 | 8/1906 | Hall | 336—60 |
|---|---|---|---|
| 1,959,513 | 5/1934 | Weyandt | 317—100 |
| 2,171,643 | 9/1939 | Brenkert | 317—100 |
| 2,710,947 | 6/1955 | Gaston | 336—60 |
| 2,735,075 | 2/1956 | Thomason | 336—60 |
| 2,881,364 | 4/1959 | Demer et al. | 317—100 |
| 2,882,478 | 4/1959 | Hobart | 317—100 |
| 2,941,123 | 6/1960 | Grebe | 317—100 |
| 3,011,105 | 11/1961 | LeBlanc | 317—100 |

FOREIGN PATENTS

| 268,911 | 4/1927 | Great Britain. |
|---|---|---|
| 606,781 | 8/1948 | Great Britain. |
| 712,826 | 8/1954 | Great Britain. |
| 763,925 | 12/1956 | Great Britain. |
| 432,487 | 3/1948 | Italy. |

JOHN F. BURNS, *Primary Examiner.*

SAMUEL BERNSTEIN, E. JAMES SAX, *Examiners.*